UNITED STATES PATENT OFFICE.

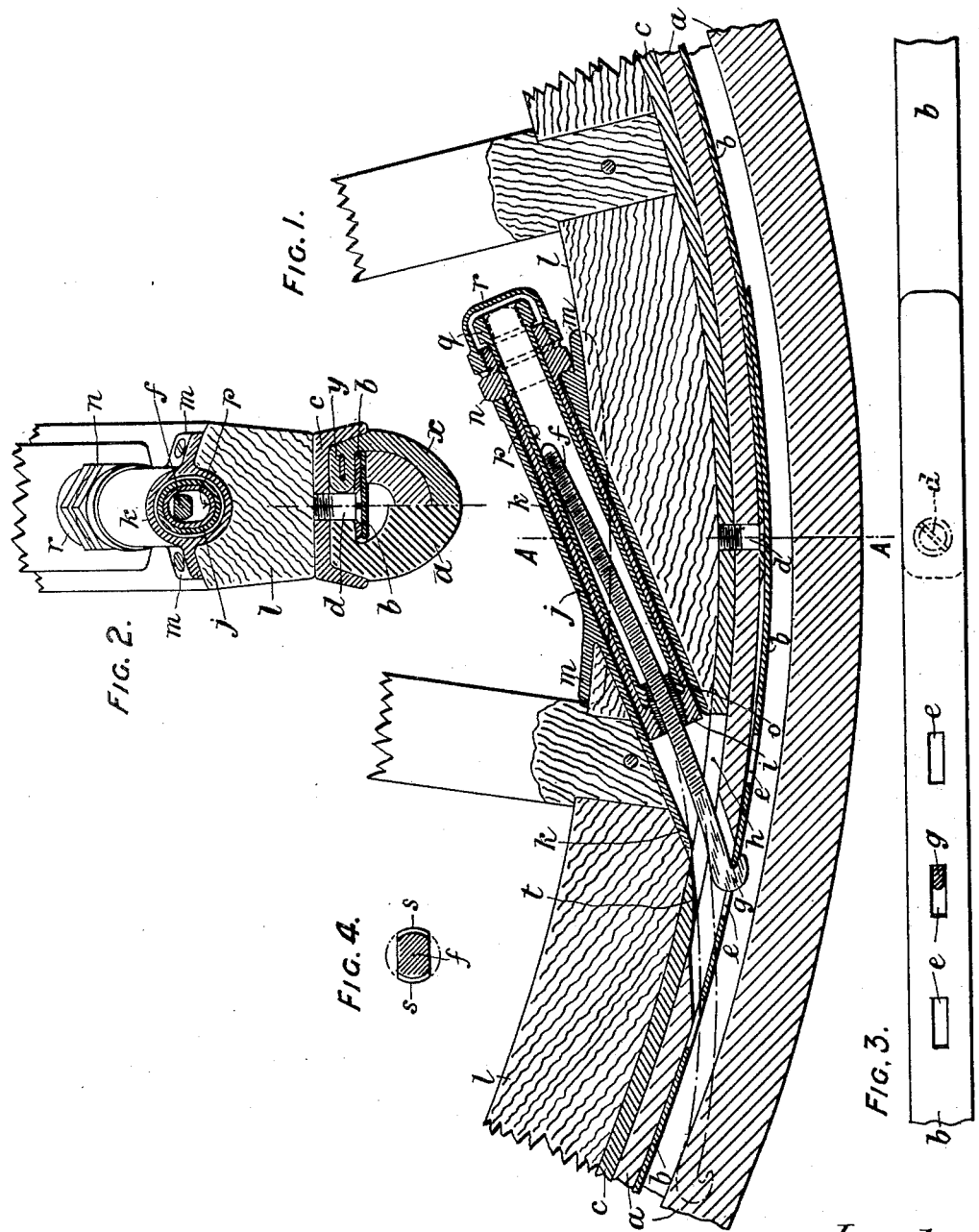

WILLIAM FREDERICK WILLIAMS, OF LONDON, ENGLAND.

MEANS FOR SECURING ELASTIC TIRES TO WHEELS.

SPECIFICATION forming part of Letters Patent No. 675,696, dated June 4, 1901.

Application filed February 16, 1901. Serial No. 47,681. (No model.)

*To all whom it may concern:*

Be it known that I, WILLIAM FREDERICK WILLIAMS, gentleman, a subject of the King of Great Britain, residing at 17 and 18 Great Pulteney street, London, England, have invented new and useful Improved Means for Securing Elastic Tires to Wheels, of which the following is a specification.

My invention relates to improved means of securing elastic tires to wheels, and has for its object to enable the tire to be readily and securely attached and the means of attachment to be adjusted or tightened as required.

The invention relates to tires which are clasped about the wheel-rim by a metal band or bands encircling the wheel-rim and binding the base of the tire or inwardly-turned marginal flanges on the cover of the tire against the wheel-rim; and the invention consists in the means of adjustably tightening and securing the same.

Reference is to be had to the accompanying drawings, forming part of this specification, wherein—

Figure 1 represents a sectional view of the means of tightening and securing the band, the section being taken in the plane of the wheel-rim. Fig. 2 is a cross-section of same on line A A, Fig. 1, this line coinciding with the joint in the tire; and Fig. 3 is a plan view of the part of the band engaged by the tightener. Fig. 4 is a detail.

$a$ is the rubber tire, of substantially D-section, through which passes a metal band $b$, encircling the wheel-rim, (or it may be two or more bands each extending partially around the circumference of the wheel,) one end of the band being secured to the channeled iron rim $c$ of the wheel (preferably at the joint in the tire, as shown) by a screw $d$ or other fixed fastening. The other end of the band is provided with a series of slots $e$ at suitable distances apart, adapted to be engaged by the tightener for the purpose of drawing the band tight and clasping the tire securely to its seat in the wheel-rim $c$.

At the left side of Fig. 2 is shown the application of the invention to a tire having no cover, and at the right side of the same figure is shown the application to a tire provided with a cover $x$, whereof the inwardly-turned marginal flanges $y$ are engaged by the band $b$.

The tightener of my invention consists of a flexible screw $f$, terminating at one end in a hook $g$, adapted to be passed through a slot $h$ in the wheel-rim and through a hole in the base of the tire $a$ or through a longitudinal central slit in the base of the tire and to be engaged in one of the holes $e$ in the band $b$ for the purpose of drawing the band tight, the screw $f$ being engaged by a nut $i$, carried at the inner end of a sleeve $j$, fitted to turn in a guide-socket $k$, passing through the felly $l$ of the wheel in an inclined direction approaching as nearly as practicable that of a tangent to the circumference of the wheel, the socket being made with a plate $m$, adapted to be screwed or otherwise fixed to the felly. The sleeve $j$ has a shoulder, as at $n$, bearing against the socket $k$ as an abutment and adapted to be turned by a suitable spanner or tool, so as when rotated to cause tension to be applied to the screw $f$ and hook $g$ and to so tighten the band $b$. In order to prevent the slacking of the nut and screw under vibration, a jam-nut $o$ is provided at the inner end of another sleeve, $p$, fitted to turn within the main sleeve $j$, the nut $o$ also engaging the screw $f$ and the nut $o$ or sleeve $p$ jamming against the nut $i$ or the sleeve $j$ when turned by means of a spanner applied to the outer end $q$ of the sleeve. $r$ is a cap to exclude dirt and prevent tampering with the jam-nut, said cap screwing on the outer end of sleeve $j$ and inclosing the end $q$ of sleeve $p$.

As it may be necessary to allow for a considerable amount of adjustment or tightening of the band $b$, and as the axis of the screw $f$ necessarily deviates very considerably from the tangent to the band at the point where the pull is applied thereto, and as the position of this point varies during the operation of tightening the band, it follows that the screw $f$ while passing axially through the nut $i$ must be capable of bending between the nut and the point of connection with the band, so as to accommodate itself to the varying direction of the pull at that point. In order to permit of this, the screw $f$ is made of oblong or flattened form in cross-section, as indicated in the enlarged cross-sectional view, Fig. 4, and is only screw-threaded on its two narrow sides s s for engagement by the nuts i and o, through which it passes, so that the screw is free to bend in the direction of its length, as shown, in order to accommodate itself to the direction of the strain. The hook g is flat and narrow in the direction of its width and fits in the holes e in the band in which it is engaged, so as to thereby prevent the screw f turning when the nut i is rotated. The other end of the screw f is pointed to enable it to be readily inserted through and engaged in the nut i, as shown in dotted lines in Fig. 1, and the sleeve j is of sufficient length to receive the whole surplus length of the screw f within it when the fastener is tightened up to its utmost extent.

In the operation of tightening up the screw the latter may bear by one of its flat sides, as indicated in the dotted position, Fig. 1, against the end t of the slot h in the wheel-rim c, whereby the required deviation in the direction of pull and the required bending of the screw (if not initially bent) are brought about, so that the part of the screw engaged or to be engaged in the nut i will sufficiently coincide therewith in axial direction to enable the one to screw upon the other without injury to the threads, while the flat side of the screw being devoid of threads will slide easily over the part t, against which it bears, and will assist to prevent the screw turning in tightening up.

Having now particularly described and ascertained the nature of this invention and in what manner the same is to be performed, I declare that what I claim is—

Means of adjustably securing an elastic tire to a wheel-rim, said means consisting in the combination with a band adapted to clasp the tire to the rim and having a series of holes, of a flexible screw-stem of flattened cross-section, having a hook adapted to engage with a hole in the band; a fixed guide for the screw whereby the latter is constrained to accommodate itself to the direction of pull of the band; a nut adapted to work upon the threaded sides of the screw and carried by an outer sleeve mounted to turn in a tangentially-inclined guide-socket in the wheel-felly, and a jam-nut also adapted to engage the screw and carried by an inner sleeve received within the outer sleeve and adapted to receive the screw within it, both sleeves being adapted to be turned by spanners or tools, substantially as specified.

WILLIAM FREDERICK WILLIAMS.

Witnesses:
C. G. CLARK,
T. W. KENNARD.